United States Patent
Wissa

[15] 3,635,078
[45] Jan. 18, 1972

[54] SOIL CONSOLIDOMETER
[72] Inventor: Anwar E. Z. Wissa, Marblehead, Mass.
[73] Assignee: Massachusetts Institute of Technology, Cambridge, Mass.
[22] Filed: May 25, 1970
[21] Appl. No.: 40,022

[52] U.S. Cl. ..................................... 73/89, 73/84, 73/88 E, 73/94
[51] Int. Cl. .......................................................... G01n 3/08
[58] Field of Search ........................... 73/88 E, 89, 94, 84

[56] References Cited

UNITED STATES PATENTS

| | | | |
|---|---|---|---|
| 3,216,242 | 11/1965 | Eyrich | 73/94 |
| 3,199,341 | 8/1965 | Heuer et al. | 73/94 |
| 3,448,608 | 6/1969 | Bishop et al. | 73/94 |
| 2,811,038 | 10/1957 | Karol | 73/94 |
| 3,035,437 | 5/1962 | Watkins et al. | 73/94 |
| 3,457,777 | 7/1969 | Nielsen | 73/84 |

Primary Examiner—James J. Gill
Assistant Examiner—Marvin Smollar
Attorney—Thomas Cooch, Martin M. Santa and Robert Shaw

[57] ABSTRACT

A consolidometer and method for measuring the one-dimensional stress-strain and time rate of consolidation properties of compressible soils. A thin-walled sample ring containing a test specimen is placed in a thick-walled outer ring. The rings, in turn, are placed on the base of a cell chamber thereby forming a test chamber. A piston head containing a coarse porous stone is placed against the top of the sample and a diaphragm between the piston head and test chamber isolates the specimen from the cell chamber. The test specimen can be loaded axially by applying pressure to the cell chamber and/or externally through a piston shaft which is placed against the piston head and extends through an aperture in the top plate of the cell chamber. The one-dimensional stress-strain and time rate of consolidation properties of the specimen can be determined from measurements as a function of time of the applied stress and the excess pore water pressures developed within the test specimen when it is deformed at a constant rate of strain while it is kept saturated under a water back pressure applied through the coarse stone in the piston head. The consolidometer is also to be used to measure the residual pore water pressure of the test specimen prior to loading, and its swell pressure during saturation at constant volume.

5 Claims, 1 Drawing Figure

PATENTED JAN 18 1972
3,635,078
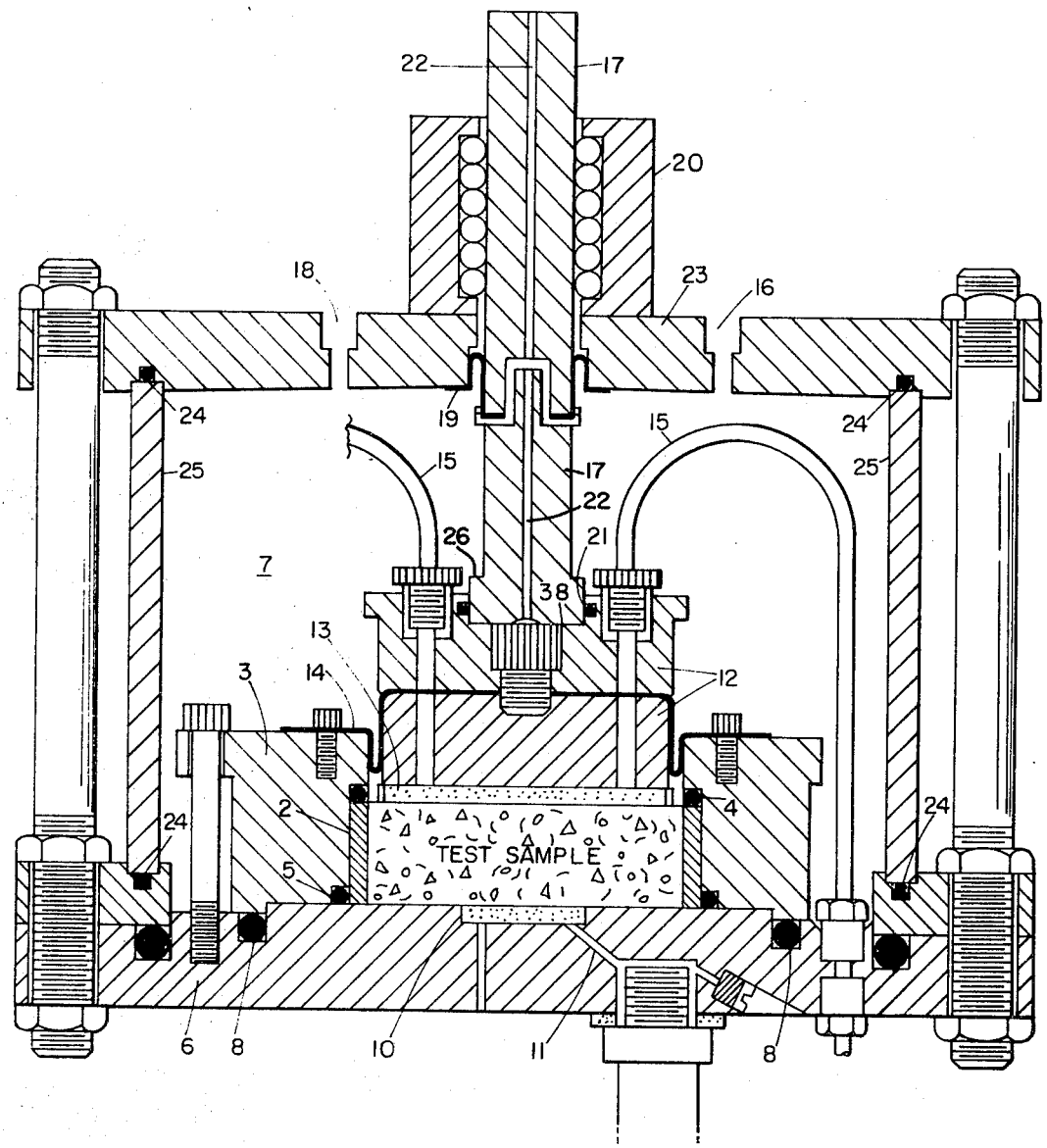
INVENTOR:
ANWAR E.Z. WISSA

SOIL CONSOLIDOMETER

BACKGROUND OF INVENTION

1. Field of Invention

This invention relates to the measurement of engineering properties of soils and in particular to the magnitude and time rate of settlement of compressible soil strata caused by changes in effective stress in the strata.

2. Description of Prior Art

In order to predict the magnitude and time rate of settlement of structures constructed on compressible soil foundations it is necessary to determine the compressibility and coefficient of consolidation of underlying soil strata as a function of applied load. These soil properties are usually obtained by conducting standard one-dimensional consolidation tests (oedometer tests) on undisturbed samples of the strata in the laboratory. The standard test consists of loading the sample incrementally every 24 hours and recording the time rate of settlement during each load increment. Normally, the load on the soil is doubled for each load increment. From these data, the stress-strain relationship is expressed by a graph of the void ratio versus the logarithm of the effective stress, and the coefficient of consolidation is determined by fitting the time rate of settlement data obtained during each load increment to the theoretical curve obtained from the solution to the Terzaghi consolidation equation for an increment of load.

There are several disadvantages to the standard test. It takes 2 to 3 weeks to obtain the necessary data. Logarithm or root fitting procedures must be used to obtain the coefficient of consolidation. The data is discrete as opposed to continuous whereby only the average values of permeability, compressibility, and coefficient of consolidation can be computed for each load increment. During the initial stages of consolidation under each load increment the test sample is subjected to very large hydraulic gradients which are not representative of typical field conditions. Further, by doubling the load, the location of the maximum curvature of the void ratio-log consolidation pressure curve is frequently poorly defined and it becomes difficult to obtain an estimate of the maximum past pressure that is used to determine the insitu strength and compressibility behavior of cohesive soils.

SUMMARY OF INVENTION

In view of the aforementioned limitations in determining the one-dimensional stress-strain and time rate of consolidation properties of compressible soils by the standard incremental test, applicant's primary object is to provide an apparatus and method for measuring more accurately the stress-strain and time rate of consolidation properties of soils in 1 or 2 days.

It is a further object to provide an apparatus and method for measuring the residual pore water pressure in a soil specimen prior to loading and to measure its swell pressure during flooding and or saturation at constant volume.

These and other objects are met by an apparatus which deforms a test specimen at a constant rate of strain while it is subjected to a water back pressure and a method of taking certain measurements of applied rate of strain, resulting vertical stress, deformation, and excess pore pressure thereby yielding the stress-strain and time rate of consolidation properties of the test specimen. The soil specimen to be tested is contained in a thin-walled sample ring which in turn is placed in a thick-walled outer ring. The rings in turn are placed on the base of a cell chamber thereby forming a test chamber. A small fine porous stone for pore water measurement at a known location is contained in the bottom of the test chamber within the base of the cell chamber. The stone is hydraulically connected through a small channel in the base to an external pressure transducer. A piston head containing a coarse porous stone is placed against the top of the test specimen which is isolated from the cell chamber by a diaphragm between the test chamber and the piston head. There are two flexible tubes connected to the coarse porous stone through which an applied back water pressure can be applied to saturate the sample and are also used for controlling drainage from the test specimen. The test specimen can be loaded axially in one dimension by applying pressure to the cell chamber and/or externally by applying a load to a piston shaft which rests against the piston head and extends through the cell chamber.

The stress-strain and time rate of consolidation properties are determined by taking certain continuous measurements of the applied rate of strain, resulting vertical stress, deformation, and excess pore pressure at one or more locations within the specimen while it is deformed at a constant rate under an applied back water pressure.

Further objects and a better understanding of the apparatus and process will become more apparent with the following description taken in conjunction with the accompanying drawing.

DRAWING

FIG. 1 is a cross-sectional perspective of the assembled consolidometer.

PREFERRED EMBODIMENT

The specimen of the soil to be tested is placed in a thin-walled sample ring 2 which in turn is placed in a thick-walled outer ring 3. The fit between the inner ring 2, and the outer ring 3, must be tight in order to approximate the assumption of no lateral strain when the specimen is subjected to an axial load. The inner ring 2 and the outer ring 3 are sealed from each other by a top O-ring 4 and a bottom O-ring 5. The unit formed by the inner ring 2 and outer ring 3 and containing the test specimen is slid onto the base 6 of the cell chamber 7 in such a manner that the specimen is always in contact with the base 6. The outer ring 3 is bolted to base 6 and sealed from the base by O-ring 8, thereby forming test chamber 9.

The bottom of test chamber 9 contains a saturated fine ceramic porous stone 10 of a high air entry value which is connected by a channel 11 in base 6 to an external pressure transducer. This stone 10 and the channel 11 must be saturated with water before the rings containing the sample are positioned.

A piston head 12 contains a coarse porous stone 13 located on the top of the test specimen. The clearance between the piston head 12 and the inner sample ring 2 which forms the test chamber wall is small in order to apply a uniform displacement to the top surface of the test specimen and to prevent soil from squeezing out during loading. The test chamber 9 is sealed from the cell chamber 7 by a rolling diaphragm 14 connecting outer ring 3 and piston head 12.

The test sample may be saturated by subjecting it to a water back pressure through the coarse porous stone 13 which is connected by spiralled polyethylene tubes 15 passing through base 6 to external drainage valves.

The sample may be loaded axially in one dimension by applying an external load to piston shaft 17 which is placed against piston head 12. The piston shaft 17 runs in a guide assembly 20 mounted on the top plate 23 of cell chamber 7. A rolling diaphragm 19 provides a seal between the cell chamber 7 and the piston shaft 17. Upon assembly the piston shaft 17 is pushed into the recess 38 contained in the piston head 12 and sealed against the cell pressure by O-ring 21, thereby preventing the cell pressure from acting on the bottom surface of the piston shaft 17. By making the effective pressure area of the rolling diaphragm 19 less than the cross-sectional area of the collar 26 at the bottom of the piston shaft 17 there is a resulting net downward force on the piston shaft due to the cell pressure, thereby causing the piston shaft to remain in contact with the piston head 12. The effective pressure area of diaphragm 19 is the area of the gap between plate 23 and shaft 17.

Alternately, the sample may be loaded by increasing the pressure in cell chamber 7. Circular O-rings 24 seal the wall 25 of the cell chamber 7 from the top plate 23 and base 6. The cell pressure can be increased or decreased through inlet valve 16 or air vent 18 respectively in top plate 23. The piston shaft 17 contains a small channel opening 22 connecting the bottom of the shaft to the top which acts as an air vent for any cell fluid or gas which might leak through O-ring 21 when the cell chamber pressure is applied.

After the consolidometer is assembled, the test specimen is allowed to drain only from its top surface through coarse porous stone 13; and prior to applying any water back pressure or load, the residual pore pressure is recorded by an external pressure transducer connected to fine porous stone 10 thereby yielding a measure of the sample disturbance. The residual pore pressure is the water pressure existing in the pores of the sample being tested before external pressures are brought to bear on the test specimen.

After this measurement is performed, a stiff load cell is placed against the top of piston shaft 17. This keeps the piston shaft 17 stationary and measures the swell pressure exerted by the soil when a water back pressure is applied through tubes 15 and the coarse porous stone 13 at the top of the test sample. At the same time, the cell chamber pressure is increased to a pressure slightly higher than the back pressure to prevent the rolling diaphragm 14 from losing its convolution. The test specimen equilibrates at essentially constant volume since the load cell prevents the sample from swelling during saturation. The swell pressure is thus determined from the load cell readings.

After these measurements have been performed the piston shaft 17 is loaded in such a manner that the piston head 12 moves at constant velocity. The force required to keep the piston head at constant velocity must be measured as a function of time. One means for accomplishing this is to insert the whole consolidometer in a gear-drive load frame with a load cell inserted between the frame and the top of piston shaft 17. The load required to maintain constant piston velocity is monitored as a function of time with the load cell. The deformation is monitored as a function of time by a linear displacement transducer. In this manner, the sample is subjected to a constant rate of strain. While the sample is being compressed, it remains subjected to constant water back pressure applied through the coarse stone 13 via tubes 15 by means of a constant pressure apparatus. The applied back pressure is monitored externally as a function of time by a pressure transducer pore pressure is monitored as a function of time by the external pressure transducer connected hydraulically by channel 11 to the fine porous ceramic stone 10 at the bottom of test chamber 9. It is essential that this pore pressure measuring system has a minimum time lag in its response. It should be noted that the fine porous ceramic stone does not have to be located in the bottom of the test chamber, but it is positioned there for convenience.

The stress-strain relationship of the test specimen can be obtained by plotting the continuous values of deformation versus the effective stress. The deformation is obtained from the linear displacement transducer such as the commonly used deflection-indicating dial gauge as illustrated in U.S. Pat. No. 3,216,242. The effective stress is related to the actual stress and the excess pore pressure by functional relationships described by Wissa et al. "The Constant Rate of Strain Consolidation Test," a copy of which is in the Patent Office Scientific Library. For slow rates of strain, the excess pore pressure is negligible, and the effective stress is the actual stress applied to the top of the sample. However, under these conditions it is not possible to accurately determine the coefficient of consolidation. If the rate of strain is too fast, large excess pore pressures develop and the sample is subjected to high hydraulic gradients which are not representative of field conditions. If the proper rate of strain is applied, the excess pore pressure will be large enough to permit coefficient of consolidation values to be computed from the data obtained at the same time as the deformation versus effective stress relationship. Tests performed at these proper rates of strain can be completed in 1 to 2 days as compared to the standard incremental test which takes a minimum of a week to complete.

If during some stage of the constant rate of strain test, it is desired to study the behavior of the test specimen under constant stress, the loading is stopped and the cell chamber pressures is increased until the external load is completely off the piston shaft 17. The test specimen is kept at constant stress by keeping the cell pressure constant, and its deformation is monitored as a function of time.

An added feature of the apparatus is that the standard incremental or constant rate of stress consolidation test may be performed. The incremental test may be completed by either raising the cell pressure incrementally or by externally applying an incremental load to the piston shaft while measuring the deformation as a function of time. In order to effectuate a constant rate of stress, the cell pressure or applied load is increased at a constant rate and the deformation versus time is monitored.

What is claimed is:

1. An apparatus for performing tests to determine the one-dimensional stress-strain and time rate of consolidation properties of a compressible soil specimen comprising:
   a. means for restraining said soil specimen in two dimensions,
   b. means for applying a water back pressure to saturate said soil specimen,
   c. means for deforming said sample at a constant rate in one dimension to said soil specimen,
   d. means for sensing the pore pressure in one location in said soil specimen.

2. The apparatus of claim 1 including the following additional elements:
   a. means for monitoring the water back pressure,
   b. means for monitoring the deformation of said soil sample,
   c. means for monitoring the force required to deform said sample at a constant rate of strain, and
   d. means for monitoring the pore pressure in one location in said soil specimen.

3. An apparatus for performing tests to determine the one-dimensional stress-strain and time rate of consolidation properties of a compressible soil specimen comprising:
   a. a cell chamber containing a cylindrical opening in its top surface,
   b. a test chamber located within said cell chamber, and constraining said soil specimen in two dimensions,
   c. a piston head containing a porous surface layer whose dimensions are slightly smaller than the inside dimensions of said test chamber and said piston head positioned such that said porous layer rests against said soil specimen,
   d. means for connecting said porous layer to the exterior of said cell chamber and through which a back water pressure may be applied through said porous layer to said soil specimen,
   e. means for sensing port water pressure in one location with said soil specimen,
   f. means for transmitting signals from sensing means to the exterior of said cell chamber,
   g. means for flexibly connecting said piston head to said test chamber thereby isolating hydraulically said soil specimen from said cell chamber,
   h. a piston shaft resting against said piston head and extending through said cylindrical opening of said cell chamber,
   i. a flexible seal between said piston shaft and said cell chamber,
   j. means for loading said piston shaft, and
   k. means for controlling the pressure in said cell chamber.

4. An apparatus for measuring the one-dimensional stress-strain and time rate of consolidation properties of a compressible soil specimen comprising:
   a. a thin-wall inner retaining ring for containing said soil specimen,
   b. a thick-walled outer retaining ring into which said inner retainer fits tightly,
   c. a cell chamber comprised of
      1. a baseplate upon which said inner thin and outer thick retaining ring rest, thereby forming a test chamber, 2. a retaining wall which rests on said base,
3. a top plate containing an inlet valve, exhaust valve and a cylindrical opening which rests on said retaining wall,
d. means for assembling and sealing said cell chamber,
e. a fine ceramic porous stone with high air entry value placed on the baseplate of said test chamber,
f. a channel hydraulically connecting said fine porous stone to the exterior of said cell chamber,
g. a piston head containing a coarse porous stone whose dimensions are slightly smaller than the inside diameter of said inner retaining ring, said coarse stone being in contact with said sample,
h. tubes connecting said porous stone through said piston head to the exterior of said cell chamber,
i. a movable diaphragm secured to said piston head and to said outer ring to isolate said test chamber including said coarse porous stone from said cell chamber,
j. a piston guide assembly mounted on said top plate,
k. a piston shaft held in place by said piston guide assembly passing through said cylindrical opening and resting on said piston head,
l. flexible means for sealing said piston head from said piston shaft,
m. a small channel running axially through said piston shaft to pass to the exterior of the cell any cell fluid which leaks by said piston sealing means,
n. a diaphragm connected between said top plate and said piston shaft thereby sealing the interior of said cell chamber from its exterior, the effective area of said diaphragm being slightly less than said diameter of the bottom of said piston shaft.

5. A method for determining the one-dimensional stress-strain and time rate of consolidation properties of a compressible soil specimen comprising the following steps:
a. retaining said soil specimen laterally,
b. allowing said soil specimen to drain only from its top surface,
c. measuring and monitoring the base pore pressure during draining,
d. subsequently constraining said soil specimen in three dimensions,
e. saturating said soil pressure by applying a back water pressure to its top surface,
f. allowing the sample to equilibrate at constant volume,
g. monitoring the force exerted by said soil specimen in one dimension,
h. then subsequently, applying a constant back water pressure to one surface of said soil specimen,
i. deforming at a constant rate said soil specimen in the direction perpendicular to said surface to which a back water pressure is applied,
j. monitoring the force necessary to deform said soil specimen in one dimension at a constant rate,
k. measuring the monitoring said pore pressure within said soil specimen at any one location.

* * * * *